(12) United States Patent
Choi et al.

(10) Patent No.: US 11,554,780 B2
(45) Date of Patent: *Jan. 17, 2023

(54) REGENERATIVE BRAKING CONTROL SYSTEM AND METHOD OF AWD HYBRID VEHICLE

(71) Applicants: Hyundai Motor Company, Seoul (KR); Kia Motors Corporation, Seoul (KR)

(72) Inventors: Yong Kak Choi, Seoul (KR); Joon Shik Park, Seoul (KR); Chang Min Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

This patent is subject to a terminal disclaimer.

(21) Appl. No.: 16/898,991

(22) Filed: Jun. 11, 2020

(65) Prior Publication Data

US 2021/0122371 A1   Apr. 29, 2021

(30) Foreign Application Priority Data

Oct. 23, 2019 (KR) .................. 10-2019-0131860

(51) Int. Cl.
*B60W 10/08* (2006.01)
*B60W 30/18* (2012.01)
(Continued)

(52) U.S. Cl.
CPC ......... *B60W 30/18127* (2013.01); *B60K 6/52* (2013.01); *B60L 7/26* (2013.01); *B60W 10/08* (2013.01); *B60W 10/10* (2013.01); *B60W 10/188* (2013.01); *B60W 10/196* (2013.01); *B60W 20/00* (2013.01); *B60W 20/30* (2013.01);
(Continued)

(58) Field of Classification Search
CPC ........... B60W 30/18127; B60W 20/30; B60W 10/10; B60W 10/188; B60W 10/08; B60W 2540/00; B60W 2540/10; B60W 2540/12; B60W 2710/1005; B60W 2710/18; B60W 2540/16; B60W 2710/08; B60W 2710/083; B60W 30/182; B60W 50/10; B60K 2370/12; B60K 6/52; B60L 7/26; F16H 2059/0247
See application file for complete search history.

(56) References Cited

U.S. PATENT DOCUMENTS

9,248,822 B2 * 2/2016 Hyun .................. B60W 10/192
9,923,490 B2 * 3/2018 Hisano ...................... H02P 3/14
(Continued)

*Primary Examiner* — Roger L Pang
(74) *Attorney, Agent, or Firm* — Slater Matsil, LLP (57) ABSTRACT

A regenerative braking control system of an AWD (all-wheel-drive) hybrid vehicle including a front wheel HEV (hybrid electric vehicle) powertrain and a rear wheel EV (electric vehicle) powertrain is provided. The control system includes a manipulating instrument mounted to a steering wheel for manual shifting and regenerative braking control by a driver's manipulation, and a controller for adjusting a regenerative braking amount and controlling a shift pattern of each of a front wheel motor of the front wheel HEV powertrain and a rear wheel motor of the rear wheel EV powertrain by receiving a (−) or (+) manipulation signal or a hold manipulation signal of the manipulating instrument.

23 Claims, 7 Drawing Sheets

(51) Int. Cl.
*B60L 7/26* (2006.01)
*B60W 10/196* (2012.01)
*B60W 10/10* (2012.01)
*B60W 10/188* (2012.01)
*B60W 20/00* (2016.01)
*B60W 20/30* (2016.01)
*B60K 6/52* (2007.10)
*B60W 30/182* (2020.01)
*B60W 50/10* (2012.01)

(52) U.S. Cl.
CPC .... *B60W 30/182* (2013.01); *B60W 30/18072* (2013.01); *B60W 50/10* (2013.01); *B60W 2520/10* (2013.01); *B60W 2530/00* (2013.01); *B60W 2540/00* (2013.01); *B60W 2540/10* (2013.01); *B60W 2540/12* (2013.01); *B60W 2540/16* (2013.01); *B60W 2710/083* (2013.01); *B60W 2710/1005* (2013.01); *B60W 2710/18* (2013.01)

(56) References Cited

U.S. PATENT DOCUMENTS

| | | | |
|---|---|---|---|
| 10,377,242 B2* | 8/2019 | Murase | B60L 15/2045 |
| 11,046,316 B2* | 6/2021 | Na | B60K 6/547 |
| 11,180,149 B2* | 11/2021 | Choi | B60K 6/442 |
| 2007/0241611 A1* | 10/2007 | Shimada | B60K 6/44 303/155 |
| 2017/0247027 A1* | 8/2017 | Nefcy | B60W 50/082 |
| 2018/0236866 A1* | 8/2018 | Paterno | B60K 6/52 |
| 2019/0366993 A1* | 12/2019 | Park | B60L 7/18 |

* cited by examiner

REGENERATIVE BRAKING CONTROL SYSTEM AND METHOD OF AWD HYBRID VEHICLE

CROSS-REFERENCE TO RELATED APPLICATIONS

This application claims priority to Korean Patent Application No. 10-2019-0131860, filed on Oct. 23, 2019, which application is hereby incorporated herein by reference.

TECHNICAL FIELD

The present invention generally relates to a regenerative braking control system and method of an AWD (all-wheel-drive) hybrid vehicle.

BACKGROUND

A steering wheel in gasoline and diesel vehicles is equipped with a manipulating instrument for manual shifting.

Figure 1:
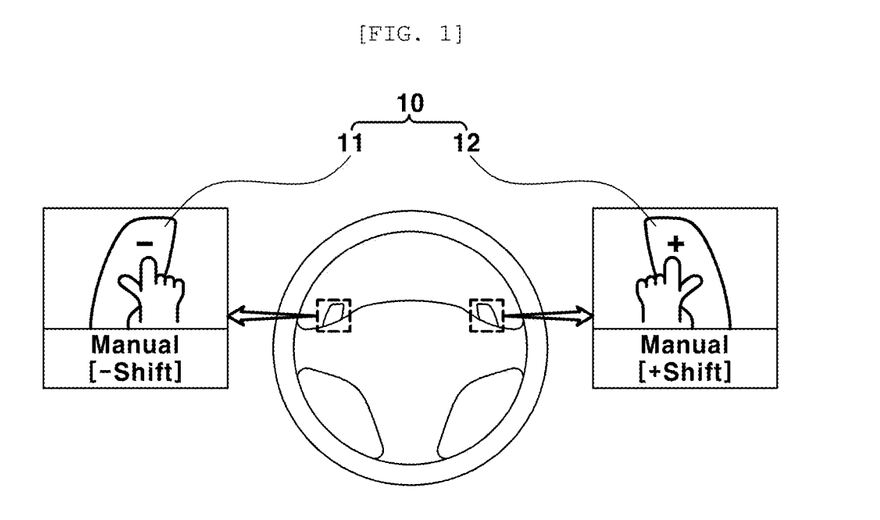
FIG. 1 is a diagram showing an example in which a paddle for manual shifting is provided on a steering wheel of an internal combustion engine vehicle.

As shown in FIG. 1, a pair of paddles 10 including a (−) paddle 11 and a (+) paddle 12 may be mounted as an example of the manipulating instrument for manual shifting.

Accordingly, when the (+) paddle 12 of a side of the pair of paddles 10 is manipulated, a transmission stage of an automatic transmission 22 is increased by a control signal of a transmission control unit 20 (for example, in the case of a 6-speed transmission, D1→D2, D2→D3, D3→D4, D4→D5, D5→D6), and when the (−) paddle 11 of the other side is manipulated, the transmission stage of the automatic transmission is decreased by the control signal of the transmission control unit (for example, in the case of a 6-speed transmission, D6→D5, D5→D4, D4→D3, D3→D2, D2→D1).

Figure 2:
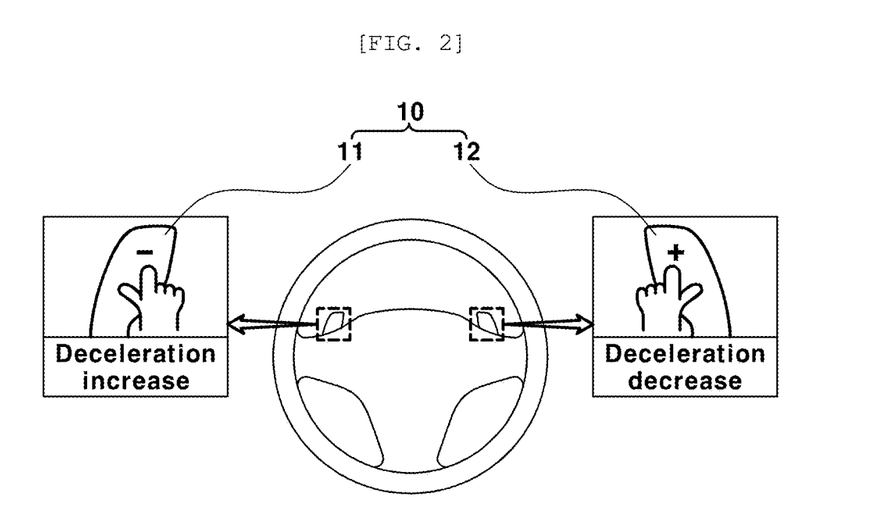
FIG. 2 is a diagram showing an example in which a paddle is provided on a steering wheel of an electric vehicle for deceleration adjustment.

As shown in FIG. 2, the pair of paddles 10 is mounted even to a steering wheel of an electric vehicle for deceleration control. When the (+) paddle 12 of a side of the pair of paddles 10 is manipulated, deceleration of the motor 32 for driving is controlled to be decreased by the control signal of a motor control unit 30, and when the (−) paddle 11 of the other side is manipulated, deceleration of the motor 32 for driving is controlled to be increased by the control signal of the motor control unit 30.

Figure 3:
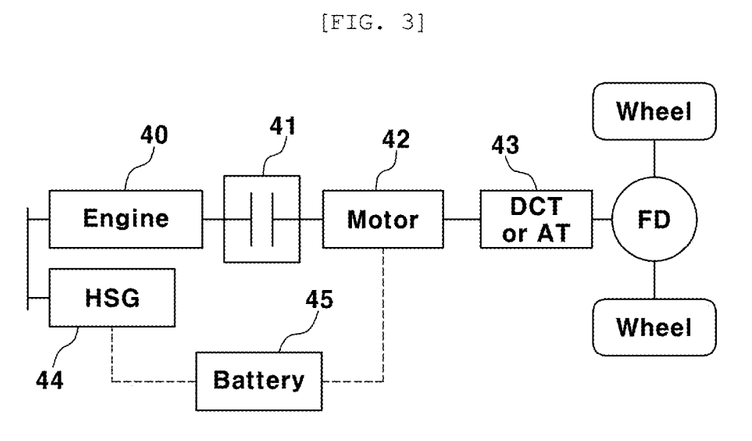
FIG. 3 is a power transmission schematic diagram of a front wheel hybrid vehicle.

FIG. 3 shows a power transmission system diagram of a front wheel drive hybrid vehicle.

As shown in FIG. 3, a powertrain of the front wheel drive hybrid vehicle is configured to include an engine 40 and a motor 42 directly connected to each other, an engine clutch 41 arranged between the engine 40 and the motor 42 to transmit or disconnect engine power, an automatic transmission 43 for shifting and outputting power to a driving wheel, an HSG (hybrid starter generator) 44 connected to a crank pulley of the engine to start and power the engine, and a battery 45 connected to the hybrid starter generator 44 so as to be charged and discharged.

The front wheel drive hybrid vehicle may include the manipulating instrument mounted even to a steering wheel thereof, the manipulating instrument being used for manual shifting or for deceleration control by changing the regenerative braking amount of the motor. The manipulating instrument may be adopted as the pair of paddles including the (−) paddle and the (+) paddle.

Accordingly, to improve a driver's driving convenience, the paddle for manual shifting or deceleration control is mounted to an internal combustion engine vehicle, the electric vehicle, and the front wheel drive hybrid vehicle, but currently, the paddle is not applicable to an AWD hybrid vehicle.

Accordingly, there is a need for a regenerative braking control system that can more intuitively control the regenerative braking amount of the AWD hybrid vehicle by using the paddle directly manipulated by a driver.

SUMMARY

The present invention generally relates to a regenerative braking control system and method of an AWD (all-wheel-drive) hybrid vehicle. Particular embodiments relate to a regenerative braking control system and method of an AWD hybrid vehicle, wherein regenerative braking and shift pattern of an AWD hybrid vehicle having a front wheel HEV and a rear wheel EV combined together can be controlled directly by a driver using a paddle.

Embodiments of the present invention have been made keeping in mind the problems occurring in the related art, and provide a regenerative braking control system and method of an AWD hybrid vehicle, wherein a regenerative braking amount of an AWD hybrid vehicle including a front wheel HEV powertrain and a rear wheel EV powertrain is controlled by a direct manipulation of a paddle by a driver according to the driving mode and driving situation, so that intuitive regenerative braking is performed together with continuous deceleration control to the front and rear wheel motors.

According to one embodiment of the present invention, there is provided a regenerative braking control system of an AWD hybrid vehicle including a front wheel HEV powertrain and a rear wheel EV powertrain, the system including a manipulating instrument mounted to a steering wheel for manual shifting and regenerative braking control by a driver's manipulation, and a controller for adjusting a regenerative braking amount and controlling a shift pattern of each of a front wheel motor of the front wheel HEV powertrain and a rear wheel motor of the rear wheel EV powertrain by receiving a (−) or (+) manipulation signal or a hold manipulation signal of the manipulating instrument.

The controller may include an HCU (hybrid control unit) for outputting a torque command signal and a shift-pattern control signal for adjusting the regenerative braking amount of each of the front wheel motor and the rear wheel motor after variably setting a torque ratio between the front wheel motor of the front wheel HEV powertrain and the rear wheel motor of the rear wheel EV powertrain by receiving the (−) or (+) manipulation signal or the hold manipulation signal of the manipulating instrument, an MCU (motor control unit) for adjusting the regenerative braking amount of each of the front wheel motor and the rear wheel motor on the basis of the torque command signal for the regenerative braking amount adjustment of each of the front wheel motor and the rear wheel motor, and a TCU (transmission control unit) for performing shift control of an automatic transmission on the basis of the shift-pattern control signal.

Preferably, the manipulating instrument may be configured as a pair of paddles including a (−) paddle and a (+) paddle capable of performing the toggling manipulation or the hold manipulation.

The regenerative braking control system of embodiments of the present invention may further include an APS and a BPS for determining a coasting state of the vehicle, and an off detection signal of the APS and BPS may be transmitted to the HCU.

The regenerative braking control system of embodiments of the present invention may further include a driving mode selection switch for selecting a vehicle driving mode as an eco mode or a sports mode, a switching signal of the driving mode selection switch being transmitted to the HCU.

In addition, when receiving a (−) toggling manipulation signal or the hold manipulation signal of the manipulating instrument while the vehicle is selected to be in the coasting state and a driving mode thereof is selected to be the eco mode, the HCU may be configured to variably set the torque ratio between the front wheel motor and the rear wheel motor and then to output the torque command signal and the shift-pattern control signal for an increase adjustment of the regenerative braking amount of each of the front wheel motor and the rear wheel motor.

Furthermore, when receiving a (+) toggling manipulation signal or the hold manipulation signal of the manipulating instrument while the vehicle is selected to be in the coasting state and a driving mode thereof is selected to be the eco mode, the HCU may be configured to variably set the torque ratio between the front wheel motor and the rear wheel motor and then to output the torque command signal and the shift-pattern control signal for a decrease adjustment of the regenerative braking amount of each of the front wheel motor and the rear wheel motor.

Additionally, while the vehicle is selected to be in the coasting state and the driving mode thereof is selected to be the sports mode, the HCU may be configured to transmit a lower-stage transmission command signal to a transmission stage lower than a current transmission stage to the TCU when the (−) manipulation signal of the manipulating instrument is received, and the HCU may be configured to transmit an upper-stage transmission command signal to a transmission stage higher than the current transmission stage to the TCU when the (+) manipulation signal of the manipulating instrument is received.

Preferably, the regenerative braking control system of embodiments of the present invention may further include an AHB (active hydraulic booster) for receiving a cooperative control signal for distribution of a total braking force from the HCU and for generating a hydraulic braking pressure of a hydraulic braking system in addition to a regenerative braking force of a motor when a driver presses the brake pedal.

According to another embodiment of the present invention, there is provided a regenerative braking control method of the AWD hybrid vehicle including the front wheel HEV powertrain and the rear wheel EV powertrain, the control method including determining whether the vehicle is in the coasting state or a current driving mode in the controller, changing a function of the manipulating instrument to a function of adjusting the regenerative braking amount when the vehicle is determined to be in the coasting state and the driving mode thereof is the eco mode in the controller, and adjusting the regenerative braking amount and controlling the shift pattern of each of the front wheel motor of the front wheel HEV powertrain and the rear wheel motor of the rear wheel EV powertrain when the controller receives the (−) or (+) manipulation signal or the hold manipulation signal of the manipulating instrument.

In the adjusting of the regenerative braking amount and the controlling of the shift pattern, the HCU of the controller may variably set the torque ratio between the front wheel motor of the front wheel HEV powertrain and the rear wheel motor of the rear wheel EV powertrain and then output the torque command signal for the regenerative braking amount adjustment of the front wheel motor and the rear wheel motor and the shift-pattern control signal.

Preferably, when vehicle speed is higher than 0 KPH, the APS is off and the BPS is off while an HCU of the controller receives a signal of a vehicle speed sensor, a signal of the APS (accelerator position sensor), and a signal of the BPS (brake position sensor), and the vehicle may be determined to be in the coasting state.

When a first manipulation signal is determined to be an initial one-time toggling input signal after determining whether the first manipulation signal for performing a (−) manipulation of the manipulating instrument is the initial one-time toggling input signal or a one-time hold input signal, an HCU of the controller may set target deceleration by vehicle speed and set the variable torque ratio between the front wheel motor and the rear wheel motor as a target torque ratio for meeting the target deceleration.

Preferably, when the HCU receives an additional one-time toggling input signal for continuously performing the (−) manipulation of the manipulating instrument within a predetermined time after receiving the initial one-time toggling input signal, control of increasing regenerative braking torque of the front wheel motor and the rear wheel motor to a predetermined level whenever the additional one-time toggling input signal is received and the shift control on the basis of the shift pattern preset for the front wheel for increasing deceleration may be performed.

In addition, when the first manipulation signal is determined to be the one-time hold input signal after determining whether the first manipulation signal for the (−) manipulation of the manipulating instrument is the initial one-time toggling input signal or the one-time hold input signal, the HCU of the controller may set the target deceleration by vehicle speed and set the variable torque ratio between the front wheel motor and the rear wheel motor as the target torque ratio for meeting the target deceleration.

Preferably, when the one-time hold input signal is received as the first manipulation signal for performing the (−) manipulation of the manipulating instrument in the HCU of the controller, a control of increasing the regenerative braking torque of the front wheel motor up to maximum regenerative braking torque, a control of increasing the regenerative braking torque of the rear wheel motor up to a predetermined level, and the shift control on the basis of the shift pattern preset for the front wheel for increasing deceleration may be performed.

When a second manipulation signal is determined to be the initial one-time toggling input signal after determining whether the second manipulation signal for performing a (+) manipulation of the manipulating instrument is the initial one-time toggling input signal or the one-time hold input signal, the HCU of the controller may set release of the target deceleration by vehicle speed and set the torque ratio between the front wheel motor and the rear wheel motor as a torque ratio for the target deceleration release.

When the HCU receives the additional one-time toggling input signal for continuously performing the (+) manipulation of the manipulating instrument within a predetermined time after receiving the initial one-time toggling input signal, a control of decreasing the regenerative braking torque of the front wheel motor to a predetermined level whenever the additional one-time toggling input signal is received and the shift control on the basis of the shift pattern preset for the front wheel for decreasing deceleration may be performed.

Furthermore, when a second manipulation signal for performing a (+) manipulation of the manipulating instrument is determined to be the one-time hold input signal, the HCU of the controller may set release of the target deceleration by vehicle speed and set the torque ratio between the front wheel motor and the rear wheel motor as a torque ratio for the target deceleration release.

Preferably, when the one-time hold input signal is received as the second manipulation signal for the (+) manipulation of the manipulating instrument in the HCU of the controller, a control of decreasing the regenerative braking torque of the front wheel motor to a reference regenerative braking torque and the shift control on the basis of the shift pattern preset for the front wheel for decreasing deceleration may be performed.

Meanwhile, when the current driving mode is determined to be the sports mode, the HCU of the controller may change the function of the manipulating instrument to a transmission stage adjustment function of a transmission, so that when the first manipulation signal for the (−) toggling manipulation is received, a control for a transmission stage decrease may be executed, and when a second manipulation signal for the (+) toggling manipulation is received, a control for a transmission stage increase may be executed.

In addition, when holding the (−) manipulation of the manipulating instrument for a predetermined time or more, motor torque may be limited to the maximum regenerative braking torque, and braking cooperative control by the AHB (active hydraulic booster) or an EPB (electric parking brake system) for generating the hydraulic braking force may be performed.

Furthermore, at a time of conversion to N stage during driving in the regenerative braking operation and when ABS or TCS operates during the driving in the regenerative braking operation, the regenerative braking of the front wheel motor and the rear wheel motor may stop, and when entering from the N stage back to a D stage and when the operation of the ABS or TCS is released, the regenerative braking of the front wheel motor and the rear wheel motor may be performed in the previous regenerative braking amount.

Embodiments of the present invention provide the following effects through the problem solving means described above.

First, in the AWD hybrid vehicle having a front wheel HEV and a rear wheel EV combined, front wheel deceleration is controlled by controlling torque and shift pattern of the front wheel motor by paddle manipulation of a driver and, at the same time, rear wheel deceleration is controlled by controlling torque of the rear wheel motor by the paddle manipulation of the driver, so optimum regenerative braking energy can be recovered and fuel efficiency can be improved.

Second, regenerative braking by the toggling manipulation of the paddle and regenerative braking by the hold manipulation of the paddle can be performed, so further intuitive regenerative braking can be performed.

Third, in a sports driving mode, manual shifting by the paddle manipulation of a driver is performed, and in an eco-driving mode, regenerative braking by the paddle manipulation of the driver is performed, so driving convenience of the driver is improved and fuel efficiency is improved.

BRIEF DESCRIPTION OF THE DRAWINGS

The above and other objects, features and other advantages of embodiments of the present invention will be more clearly understood from the following detailed description when taken in conjunction with the accompanying drawings, in which.

DETAILED DESCRIPTION OF ILLUSTRATIVE EMBODIMENTS

Hereinbelow, exemplary embodiments of the present invention will be described in detail with reference to the accompanying drawings.

Figure 4:
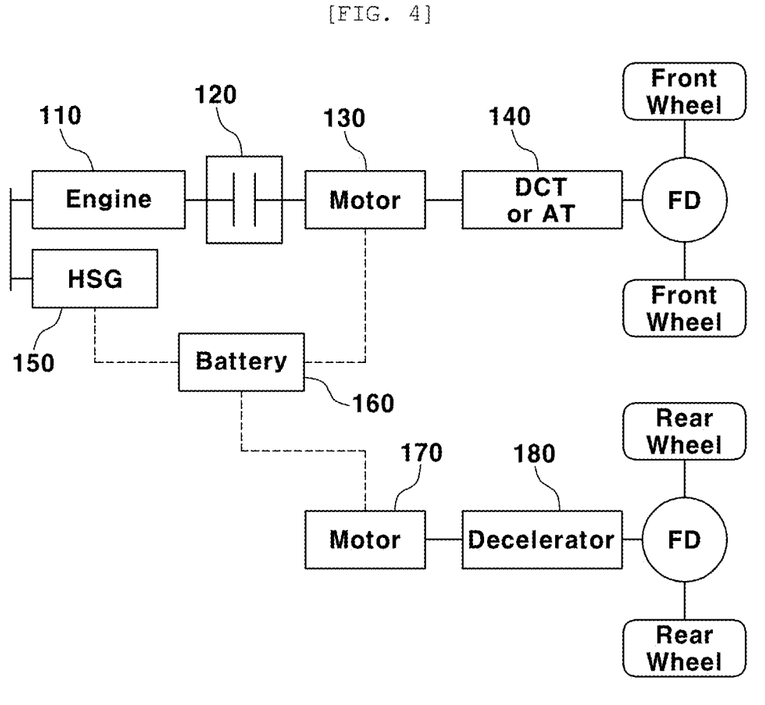
FIG. 4 is a power transmission schematic diagram of an AWD hybrid vehicle to which a regenerative braking control system is applied according to embodiments of the present invention.

FIG. 4 is a power transmission schematic diagram of an AWD hybrid vehicle to which a regenerative braking control system is applied according to embodiments of the present invention, and shows an example of an AWD (all-wheel-drive) system having a front wheel HEV (hybrid electric vehicle) powertrain and a rear wheel EV (electric vehicle) powertrain combined.

The front wheel HEV powertrain includes an engine 110 and a front wheel motor 130 directly connected to each other, an engine clutch 120 arranged between the engine 110 and the front wheel motor 130 to transmit or disconnect engine power, an automatic transmission 140 outputting the power to the front wheel by shifting the power, an HSG 150 (hybrid starter generator) connected to a crank pulley of the engine to start and power the engine, and a battery 160 connected to the front wheel motor 130 and the HSG 150 to be charged and discharged.

The rear wheel EV powertrain is configured to include a rear wheel motor 170 connected to the battery 160 to be charged and discharged and a reduction gear 180 decelerating the power of the rear wheel motor 170 to output the power to a rear wheel.

According to embodiments of the present invention, in the AWD hybrid vehicle having a front wheel HEV and a rear wheel EV combined as described above, front wheel deceleration is controlled by controlling torque and shift pattern of the front wheel motor by paddle manipulation of a driver and, at the same time, rear wheel deceleration is controlled by controlling torque of the rear wheel motor by paddle manipulation of the driver, so optimum regenerative braking energy can be recovered and further intuitive regenerative braking can be performed.

Figure 5:
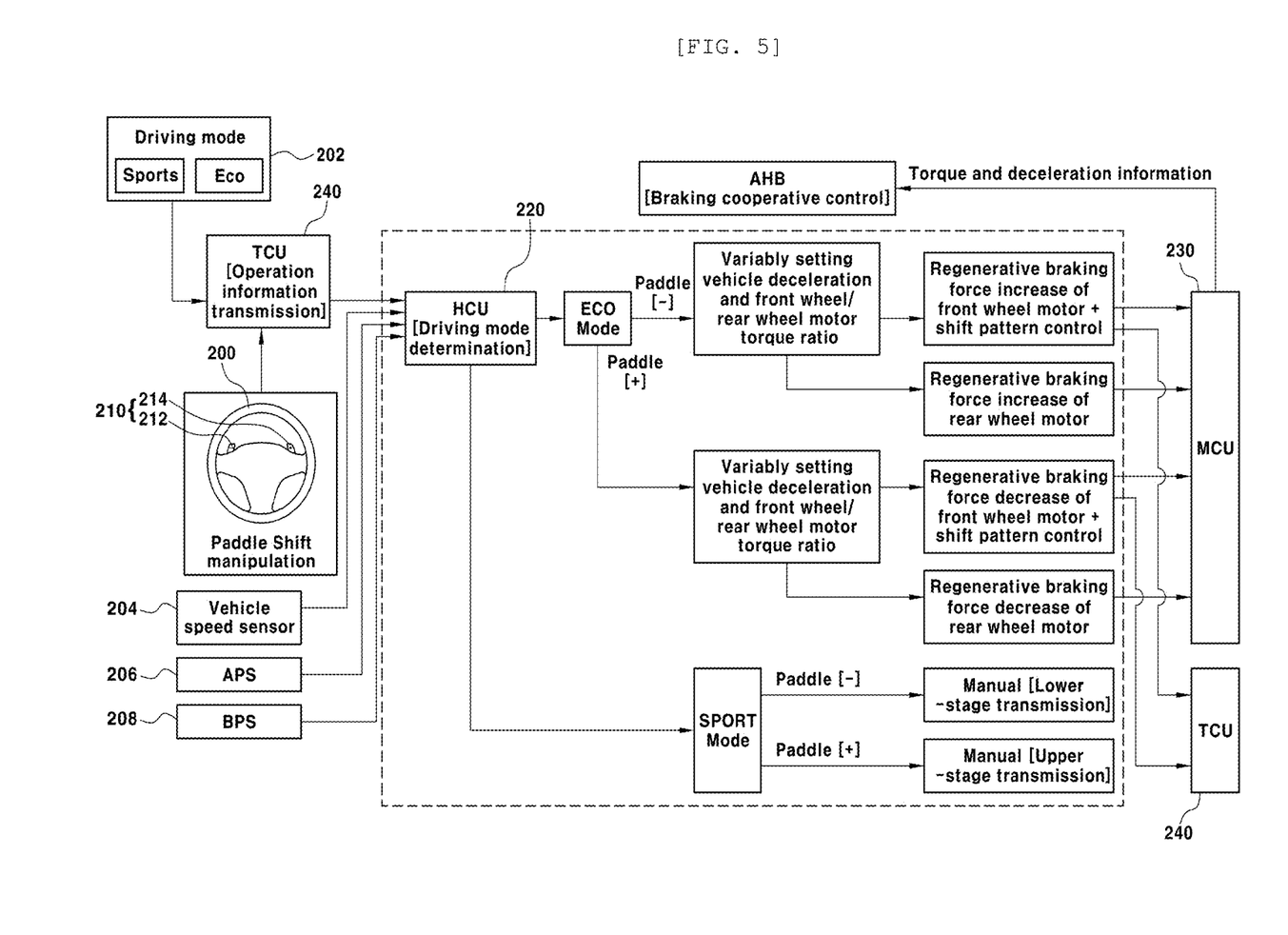
FIG. 5 is a block diagram showing the regenerative braking control system of an AWD hybrid vehicle according to embodiments of the present invention.

FIG. 5 is a block diagram showing the regenerative braking control system and a shift control system of an AWD hybrid vehicle according to embodiments of the present invention.

A manipulating instrument capable of being directly manipulated by a driver is mounted to a steering wheel of the AWD hybrid vehicle for manual shifting and the regenerative braking control.

For example, the pair of paddles 210 including a (−) paddle 212 and a (+) paddle 214 as the manipulating instrument for the manual shifting and the regenerative braking control may be mounted to the steering wheel 200 of the AWD hybrid vehicle.

Hereinbelow, in order to help the understanding of the present invention, the (−) paddle 212 and the (+) paddle 214 as the manipulating instrument will be described as an example.

A manipulation signal of the (−) paddle 212 or a manipulation signal of the (+) paddle 214 of the pair of paddles 210 is input to an HCU (hybrid control unit) 220, which is a superior controller of the AWD hybrid vehicle.

In addition, a driving mode selection switch 202 mounted to the vicinity of a driver's seat is connected to the HCU 220 to determine whether a current vehicle driving mode is an eco mode or a sports mode.

Accordingly, the HCU 220 can determine whether a current driving mode is the eco mode or the sports mode on the basis of a switching signal received from the driving mode selection switch 202.

Furthermore, in order to determine whether the current driving mode is in a coasting state, a detection signal of an APS (accelerator position sensor) 206 that turns on when an accelerator pedal is pressed and turns off when the accelerator pedal is not pressed and a detection signal of a BPS (brake position sensor) 208 that turns on when a brake pedal is pressed and turns off when the brake pedal is not pressed are input to the HCU 220.

Preferably, the manipulation signal of the paddle 210 and the switching signal of the driving mode selection switch 202 can be transmitted to the HCU 220 via a TCU (transmission control unit) 240.

Referring to FIG. 5, when a toggling or hold manipulation signal of the (−) paddle 212 by a driver is received for increasing deceleration after the current driving mode is determined to be the eco mode, the HCU 220 variably sets a torque ratio between the front wheel motor and the rear wheel motor including the vehicle deceleration and outputs a signal for controlling the increase of a regenerative braking amount of each of the front wheel motor and the rear wheel motor and a shift-pattern control signal.

More particularly, when a driver performs the toggling or hold manipulation of the (−) paddle 212 for increasing the deceleration and the regenerative braking amount after the current driving mode is determined to be the eco mode, the HCU 220 sets target deceleration by vehicle speed on the basis of the manipulation signal, sets the variable torque ratio between the front wheel motor and the rear wheel motor as a target torque ratio for meeting the target deceleration, transmits a torque command signal for increasing the regenerative braking amount of each of the front wheel motor and the rear wheel motor to an MCU 230 (motor control unit), and transmits the command signal for controlling the shift pattern to the TCU 240.

On the contrary, when a toggling or hold manipulation signal of the (+) paddle 212 by a driver for the deceleration decrease is received after the current driving mode is determined to be the eco mode, the HCU 220 variably sets the torque ratio between the front wheel motor and the rear wheel motor including the vehicle deceleration and outputs a signal for controlling the decrease of the regenerative braking amount of each of the front wheel motor and the rear wheel motor and the shift-pattern control signal.

More particularly, when a driver performs a toggling manipulation or the hold manipulation of the (+) paddle 214 for decreasing deceleration and the regenerative braking amount after the current driving mode is determined to be the eco mode, the HCU 220 sets the target deceleration by vehicle speed on the basis of the manipulation signal, sets the torque ratio between the front wheel motor and the rear wheel motor as the target torque ratio for meeting the target deceleration, transmits the torque command signal for decreasing the regenerative braking amount of each of the front wheel motor and the rear wheel motor to the MCU 230, and transmits the command signal for the shift pattern control to the TCU 240.

In this case, the MCU 230 controls the regenerative braking amount of each of the front wheel motor and the rear wheel motor on the basis of the torque command signal for regenerative braking amount control of the front wheel motor and the rear wheel motor transmitted from the HCU 220, and the TCU 240 performs shift control of the automatic transmission on the basis of the shift-pattern control signal transmitted from the HCU 220.

Referring to FIG. 5, when the current driving mode is determined to be in the sports mode, the HCU 220 perceives the manipulation function of the paddle 210 not as the function of adjusting the regenerative braking amount but as the function of manually controlling a transmission stage of the transmission.

Accordingly, when receiving the manipulation signal of the (−) paddle 212 by a driver after the current driving mode is determined to be the sports mode, the HCU 220 transmits the shift command signal to a transmission stage lower than a current transmission stage to the TCU 240, so the lower-stage transmission can be performed according to a manual manipulation of the (−) paddle 212 by the driver.

On the contrary, when receiving the manipulation signal of the (+) paddle 214 by the driver after the current driving mode is determined to be the sports mode, the HCU 220 transmits the shift command signal to a transmission stage higher than the current transmission stage to the TCU 240, so upper-stage transmission can be performed according to a manual manipulation of the (+) paddle 214 by the driver.

Meanwhile, in FIG. 5, a reference numeral 250 indicates an AHB (active hydraulic booster) 250 generating a hydraulic braking force.

The AHB 250 receives a cooperative control signal for distributing a total braking force from the HCU 220 when a driver presses the brake pedal and performs the function of generating a hydraulic braking pressure of a hydraulic braking system in addition to a regenerative braking force of the motor.

Here, a regenerative braking control method of embodiments of the present invention on the basis of the above configuration will be described hereinbelow.

Figure 6:
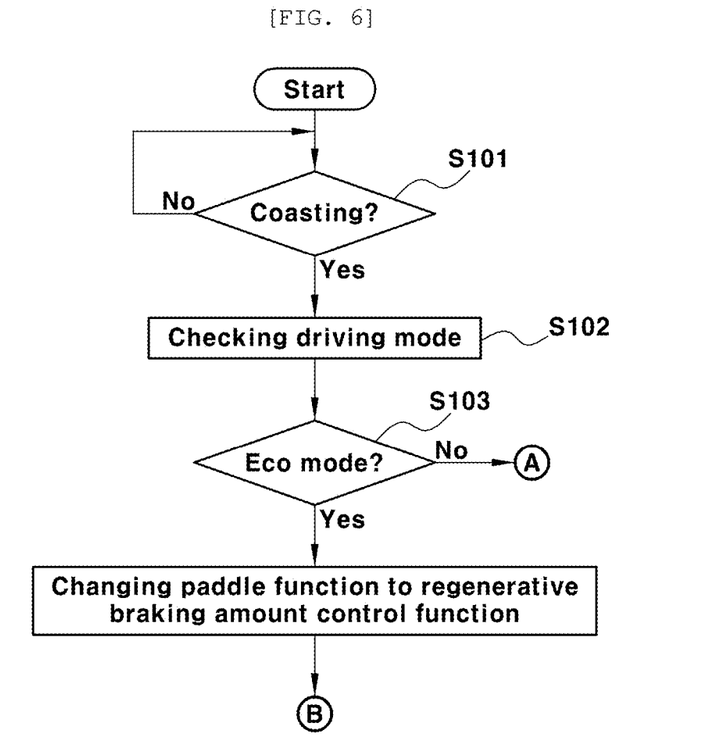
FIGS. 6 to 8 are flowcharts showing a regenerative braking control method of an AWD hybrid vehicle according to embodiments of the present invention.
Figure 7:
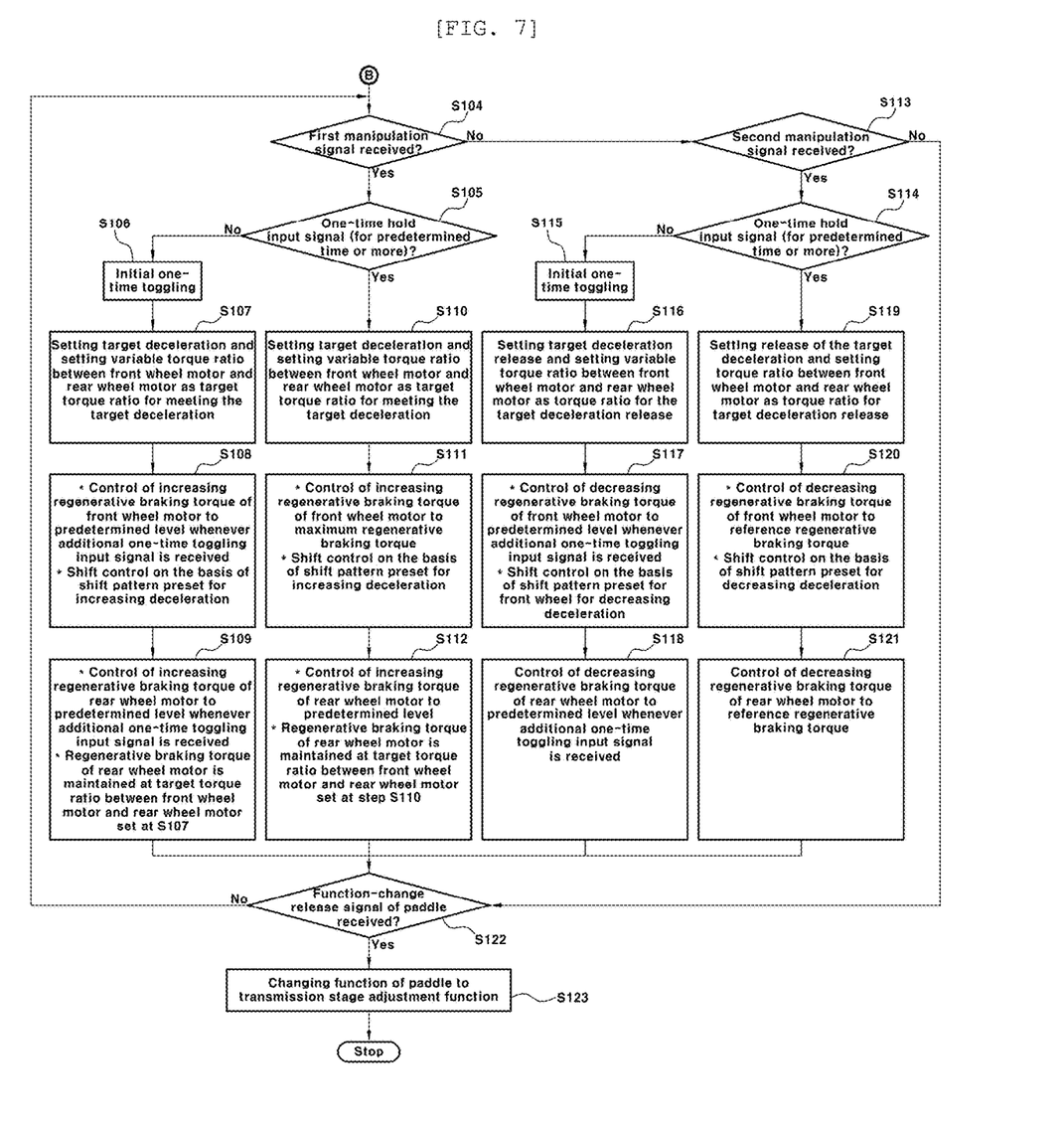
Figure 8:
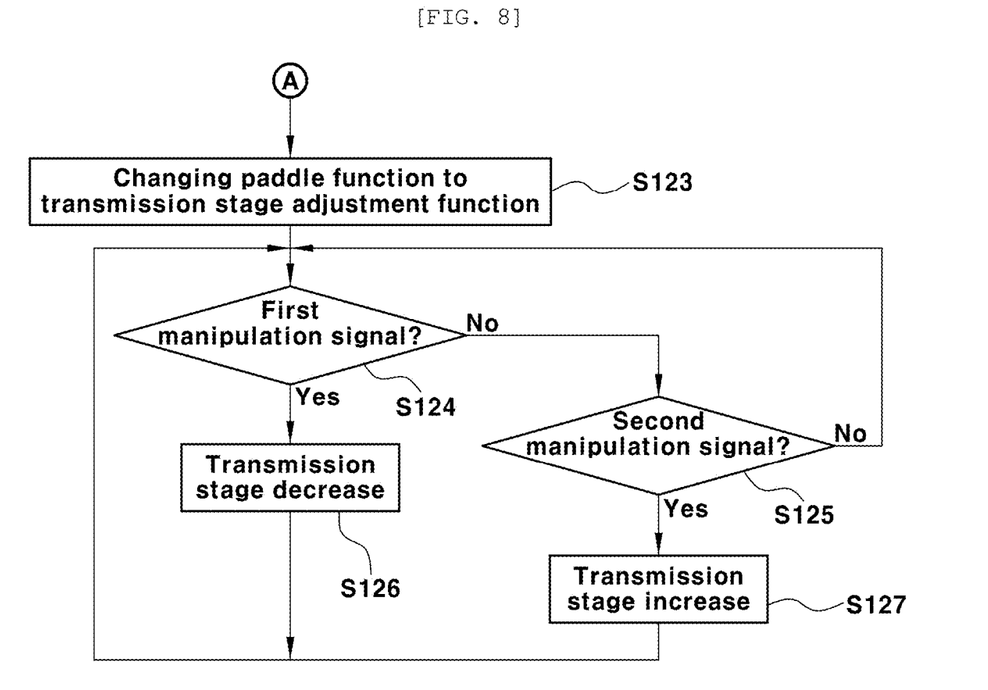

FIGS. 6 to 8 are flowcharts showing the regenerative braking control method of an AWD hybrid vehicle according to embodiments of the present invention.

First, whether a vehicle is in the coasting state is determined in the HCU 220 which is the superior controller of the AWD hybrid vehicle at S101.

For example, the HCU 220 determines that a vehicle is in the coasting state when the vehicle speed is higher than 0 KPH, the APS is off (a state in which an accelerator pedal is not pressed), and the BPS is off (a state in which a brake pedal is not pressed) by receiving a signal of a vehicle speed sensor 204, a signal of the APS 206, and a signal of the BPS 208.

Next, the HCU 220 determines the current driving mode at S102.

That is, the HCU 220 determines whether the current driving mode is selected as the eco mode on the basis of the switching signal received from the driving mode selection switch 202 installed in the vicinity of a driver's seat at S103.

After changing the function of the pair of paddles 210 including the (−) paddle 212 and the (+) paddle 214 to the function of adjusting the regenerative braking amount when the current driving mode is determined to be the eco mode in the HCU 220, it is determined whether a first manipulation signal of the (−) paddle 212 or a second manipulation signal of the (+) paddle 214 of the pair of paddles 210 by a driver is received at S104.

As a result of determining the step S104, when the first manipulation signal of the (−) paddle 212 is determined to be received, it is determined whether the first manipulation signal is an initial one-time toggling input signal or a one-time hold input signal at S105.

For reference, the toggling refers to a one-touch manipulation that flips or presses the paddle for less than a predetermined time, and the hold refers to the manipulation of maintaining the flipping or pressing of the paddle for a predetermined time or more.

As a result of determining the step S105, when the first manipulation signal of the (−) paddle 212 is determined to be the initial one-time toggling input signal at S106, the HCU 220 sets the target deceleration by vehicle speed for vehicle stopping, and sets the torque ratio between the front wheel motor and the rear wheel motor as the target torque ratio for meeting the target deceleration at S107.

When the HCU 220 receives an additional one-time manipulation signal for a continuous manipulation of the (−) paddle 212, that is, an additional one-time toggling input signal within a predetermined time after receiving the initial one-time toggling input signal, a control of increasing a regenerative braking torque of the front wheel motor to a predetermined level is performed whenever the additional one-time toggling input signal is received and, at the same time, shift control on the basis of a shift pattern preset for the front wheel for increasing the deceleration is performed by the TCU 240 according to the command of the HCU 220 at S108.

In addition, the HCU 220 performs the control of increasing the regenerative braking torque of the rear wheel motor to a predetermined level whenever the additional one-time toggling input signal is received. In this case, the regenerative braking torque of the rear wheel motor is maintained at the target torque ratio between the front wheel motor and the rear wheel motor set at the step S107 at S109.

That is, the HCU 220 performs the control of increasing the regenerative braking torque of the rear wheel motor to a predetermined level for increasing the deceleration whenever the additional one-time toggling input signal is received. At the step S107, the target torque ratio between the front wheel motor and the rear wheel motor is set, so the level of increasing the regenerative braking torque of the rear wheel motor is within the target torque ratio.

As a result of determining the step S105, when the first manipulation signal of the (−) paddle 212 is determined to be the one-time hold input signal, the HCU 220 sets the target deceleration by vehicle speed for vehicle stop, and sets the variable torque ratio of the front wheel motor and the rear wheel motor as the target torque ratio for meeting the target deceleration at S110.

Next, the one-time hold input signal is a signal according to the manipulation of the paddle by a driver for a predetermined time or more. Accordingly, the HCU 220 performs the control of increasing the regenerative braking torque of the front wheel motor to maximum regenerative braking torque, and, at the same time, shift control on the basis of the shift pattern preset for the front wheel for the deceleration increase is performed at S111.

That is, when the HCU 220 transmits the command of increasing the regenerative braking torque of the front wheel motor to the maximum regenerative braking torque to the MCU 230, the regenerative braking torque of the front wheel motor is controlled to be the maximum regenerative braking torque by the control of the MCU 230, and, at the same time, shift control based on the shift pattern preset for the front wheel is performed by the TCU 240 according to the command of the HCU 220 for increasing the deceleration.

In addition, when the first manipulation signal of the (−) paddle 212 is determined to be the one-time hold input signal, the HCU 220 performs the control of increasing the regenerative braking torque of the rear wheel motor to a predetermined level. In this case, the regenerative braking torque of the rear wheel motor is maintained at the target torque ratio between the front wheel motor and the rear wheel motor set at the step S110 at S112.

That is, when the first manipulation signal of the (−) paddle 212 is determined to be the one-time hold input signal, the HCU 220 performs the control of increasing the regenerative braking torque of the rear wheel motor for increasing the deceleration to a predetermined level. At the step S110, the target torque ratio between the front wheel motor and the rear wheel motor is set, so the level of increasing the regenerative braking torque of the rear wheel motor is within the range of the target torque ratio.

In this case, the control of increasing the regenerative braking torque of the front wheel motor and the rear wheel motor to a predetermined level and the control of increasing the regenerative braking torque of the front wheel motor to the maximum regenerative braking torque can be performed by the MCU 230 according to the command signal transmitted by the HCU 220. Shift control can be performed by the TCU 240 according to the command signal transmitted by the HCU 220 on the basis of the shift pattern preset for increasing the deceleration.

Meanwhile, as a result of determining the step S104, when it is determined that the first manipulation signal of the (−) paddle 212 is not received, whether the second manipulation signal of the (+) paddle 214 is received is determined at S113.

As a result of determining the step S113, when the second manipulation signal of the (+) paddle 214 is determined to be received in the HCU 220, whether the second manipulation signal is the initial one-time toggling input signal or the one-time hold input signal is determined at S114.

As a result of determining the step S114, when the second manipulation signal of the (+) paddle 214 is determined to be the initial one-time toggling input signal at S115, the HCU 220 sets the release of the target deceleration by vehicle speed for vehicle stopping, and sets the variable torque ratio between the front wheel motor and the rear wheel motor as the torque ratio for the target deceleration release at S116.

When the HCU 220 receives an additional second manipulation signal for a continuous manipulation of the (+)

paddle 214, that is, an additional one-time toggling input signal within a predetermined time after receiving the initial one-time toggling input signal, a control of decreasing a regenerative braking torque of the front wheel motor to a predetermined level is performed whenever the additional one-time toggling input signal is received and, at the same time, shift control on the basis of the shift pattern preset for the front wheel for decreasing the deceleration is performed at S117.

In addition, the HCU 220 performs the control of decreasing the regenerative braking torque of the rear wheel motor to a predetermined level whenever the additional one-time toggling input signal is received. In this case, the regenerative braking torque of the rear wheel motor is maintained at the torque ratio between the front wheel motor and the rear wheel motor set at the step S116 at S118.

As a result of determining the step S114, when the second manipulation signal of the (+) paddle 214 is determined to be the one-time hold input signal, the HCU 220 sets the release of the target deceleration by vehicle speed for vehicle stopping and sets the torque ratio between the front wheel motor and the rear wheel motor as a torque ratio for the target deceleration release at S119.

Next, the one-time hold input signal is a signal according to the manipulation of the paddle by a driver for a predetermined time or more. Accordingly, the HCU 220 performs the control of decreasing the regenerative braking torque of the front wheel motor to a reference regenerative braking torque (a basic motor regenerative braking amount) and, at the same time, shift control on the basis of the shift pattern preset for the front wheel for decreasing the deceleration is performed at S120.

In addition, when the second manipulation signal of the (+) paddle 214 is determined to be the one-time hold input signal, the HCU 220 performs the control of decreasing the regenerative braking torque of the rear wheel motor to the reference regenerative braking torque. In this case, the regenerative braking torque of the rear wheel motor is maintained at the torque ratio between the front wheel motor and the rear wheel motor set at the step S116 at S121.

In this case, the control of decreasing the regenerative braking torque of the front wheel motor and the rear wheel motor to a predetermined level and the control of decreasing the regenerative braking torque of the front wheel motor and the rear wheel motor to the reference regenerative braking torque can be performed by the MCU 230 according to the command signal transmitted by the HCU 220. Shift control on the basis of the shift pattern preset for decreasing the deceleration can be performed by the TCU 240 according to the command signal transmitted by the HCU 220.

Meanwhile, as a result of determining the step S103, when the driving mode selection switch 202 installed in the vicinity of a driver's seat is not selected as the eco mode but is changed from the eco mode to the sports mode, or when the eco mode is turned off, the HCU 220 changes the function of the paddle 210 to a transmission stage adjustment function of the transmission at S123.

Accordingly, to determine whether the transmission stage of the transmission is controlled, the HCU 220 determines whether the first manipulation signal of the toggling manipulation of the (−) paddle 212 of the pair of paddles 210 is received at S124, or determines whether the second manipulation signal of the toggling manipulation of the (+) paddle 214 is received at S125.

As a result of determining the step S124, when the first manipulation signal of the (−) paddle 212 is determined to be received, the HCU 220 performs a control for transmission stage decrease at S126.

On the contrary, as a result of determining the step S125, when the second manipulation signal for the toggling manipulation of the (+) paddle 214 is determined to be received, the HCU 220 performs a control for a transmission stage increase at S127.

Of course, the transmission stage decrease or increase can be performed by the TCU 240 according to the command signal transmitted by the HCU 220.

Meanwhile, after the steps S109, S112, S118, and S121 are executed, or when it is determined that the second manipulation signal of the (+) paddle 214 is not received as a result of determining the step S113, it is determined whether a function-change release signal for the paddle 210 (for example, a manipulation signal of converting a driving mode selection switch 202 from the eco mode to the sports mode or a manipulation signal of turning off the driving mode selection switch) is received in the HCU 220 at S122.

As a result of determining the step S122, when the function-change release signal is determined to be received, the HCU 220 changes the function of the paddle 210 to the transmission stage adjustment function of the transmission at S123, and the steps S124 to S127 are repeatedly executed.

Accordingly, in the AWD hybrid vehicle, front wheel deceleration is controlled by controlling the torque and shift pattern of the front wheel motor by paddle manipulation of a driver and, at the same time, rear wheel deceleration is controlled by controlling the torque of the rear wheel motor by paddle manipulation of a driver, so optimum regenerative braking energy can be recovered. In addition, the regenerative braking by the toggling manipulation and the hold manipulation of the paddle by a driver is performed, so more intuitive regenerative braking can be realized.

Here, the regenerative braking control process of the AWD hybrid vehicle according to embodiments of the present invention will be described in further detail with reference to one embodiment.

Figure 9:
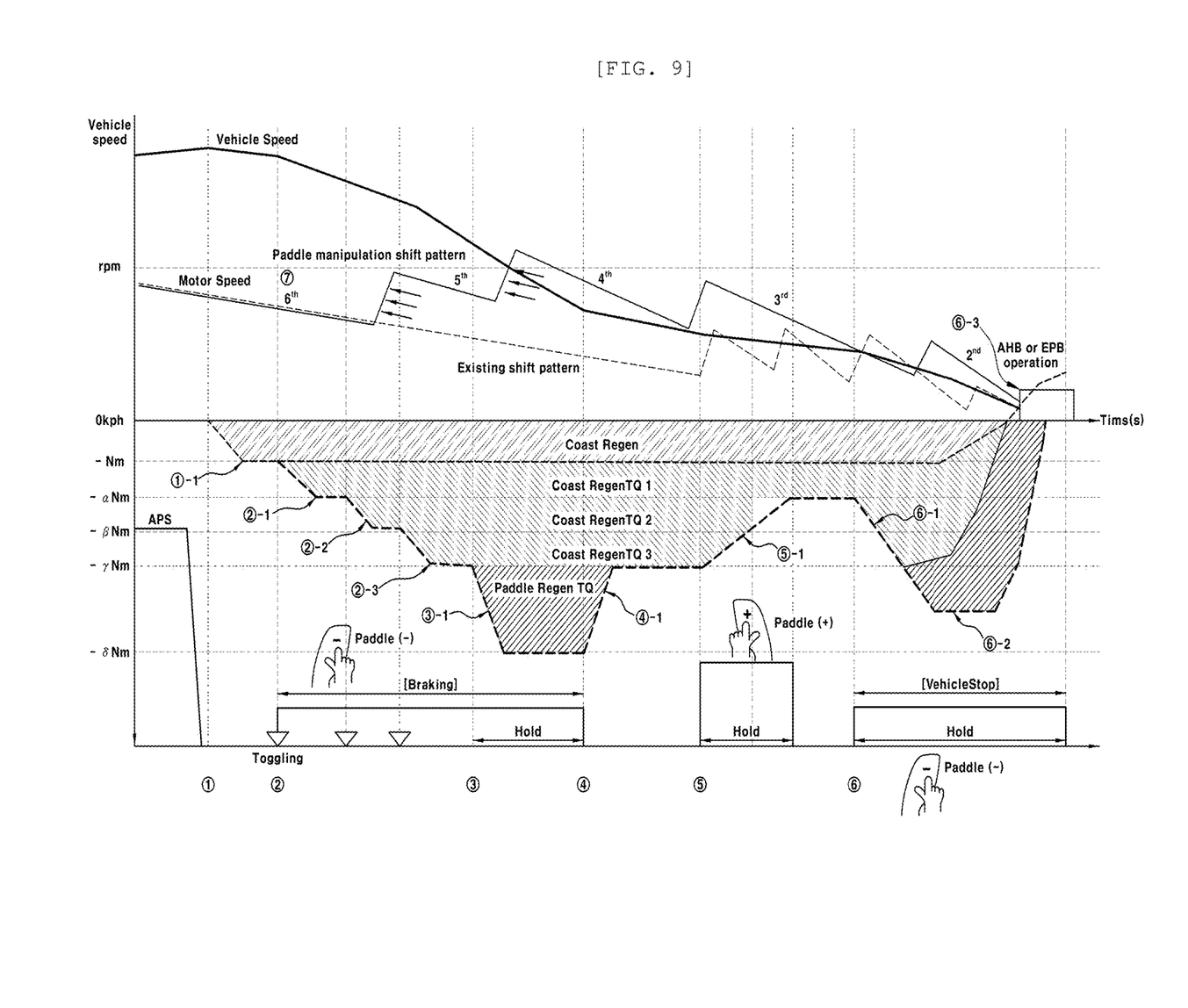
FIG. 9 is a graph showing a regenerative braking control process of the AWD hybrid vehicle as an embodiment according to the present invention.

FIG. 9 is a graph showing a regenerative braking control process of the AWD hybrid vehicle as the embodiment according to the present invention.

Basic Motor Regenerative Braking Amount

In FIG. 9, a reference numeral ① indicates an off operation of the APS 206.

When a driver releases an accelerator pedal, the motor regenerative braking amount of the AWD hybrid vehicle is adjusted to the basic motor regenerative braking amount (coast-regen) as indicated by ①-1 of FIG. 9.

More particularly, an off-signal of the APS 206 is transmitted to the HCU 220, the HCU 220 transmits the torque command signal for the basic motor regenerative braking amount to the MCU 230, and the MCU 230 controls motor torque in the basic motor regenerative braking amount.

Preferably, the basic motor regenerative braking amount can be obtained only by the regenerative braking torque control for the front wheel motor.

In this case, as described above, when a vehicle is determined to be in the coasting state (for example, when the vehicle speed is greater than 0 KPH, the APS is off, and the BPS is off during downhill driving of a vehicle), the HCU 220 variably sets the torque ratio between the front wheel motor included in the front wheel HEV powertrain and the rear wheel motor included in the rear wheel EV powertrain (for example, a front wheel motor 7: a rear wheel motor 3).

For example, as described above, when the toggling or hold manipulation signal of the (−) paddle 212 by a driver for the deceleration increase is received after the current driving mode is determined to be the eco mode, the HCU 220 variably sets the torque ratio between the front wheel motor and the rear wheel motor including the vehicle deceleration. On the contrary, when the second manipulation signal of the (+) paddle 214 is received, the HCU 220 sets the release of the target deceleration by vehicle speed and sets the variable torque ratio between the front wheel motor and the rear wheel motor as the torque ratio for the target deceleration release.

Of course, when a specific situation such as manipulation of the paddle 210 for controlling the deceleration and regenerative braking amount occurs, the torque ratio between the front wheel motor and the rear wheel motor is variably controlled. Accordingly, the motor torque can be variably controlled in the range of the front wheel motor 0%:the rear wheel motor 100% to the front wheel motor 100%:the rear wheel motor 0%.

Deceleration Control when Toggling the (−) Paddle

In FIG. 9, a reference numeral ② indicates time of the toggling manipulation of the (−) paddle 212, that is, time of toggling the (−) paddle 212 by a driver for deceleration.

Accordingly, as ②-1 of FIG. 9 indicates, during a first toggling operation of the (−) paddle 212, a first additional regenerative braking amount (coast-regen TQ 1) in addition to the basic motor regenerative braking amount is applied to the motor to increase the deceleration.

In addition, as ②-2 of FIG. 9 indicates, during a second toggling operation (during an additional toggling operation) of the (−) paddle 212, a second additional regenerative braking amount (coast-regen TQ 2) in addition to the first additional regenerative braking amount (coast-regen TQ 1) is applied to the motor to further increase the deceleration.

Furthermore, as ②-3 of FIG. 9 indicates, during a third toggling operation (during two additional toggling operations) of the (−) paddle 212 the third additional regenerative braking amount (coast-regen TQ 3) in addition to the second additional regenerative braking amount (coast-regen TQ 2) is applied to the motor to further increase the deceleration.

In this case, in addition to the basic motor regenerative braking amount, the additional regenerative braking amounts can be obtained by the regenerative braking torque control for the front wheel motor and the rear wheel motor. As described above, the deceleration amounts (②-1, ②-2, ②-3) by the manipulation of the (−) paddle may be variously determined while the torque ratio between the front wheel motor included in the front wheel HEV powertrain and the rear wheel motor included in the rear wheel EV powertrain is variably set (for example, the front wheel motor 7: the rear wheel motor 3).

Deceleration Control when Holding the (−) Paddle

In FIG. 9, a reference numeral ③ indicates a starting point of the hold manipulation of the (−) paddle 212 for the deceleration, and a reference numeral ④ indicates an end point of the hold manipulation of the (−) paddle 212 for the deceleration.

As described above, in the case of a hold manipulation of the (−) paddle (for example, the press manipulation of the paddle within seconds), the HCU 220 transmits the torque command signal for a maximum motor regenerative braking amount to the MCU 230, so the motor torque is controlled in the maximum motor regenerative braking amount by the MCU 230.

Accordingly, as a reference numeral ③-1 of FIG. 9 indicates, in the case of the hold manipulation of the (−) paddle 212, maximum target deceleration is produced by the maximum regenerative braking torque.

Furthermore, in the case of the hold manipulation of the (−) paddle 212 while the motor operates in the basic motor regenerative braking amount (coast-regen) indicated by ①-1 of FIG. 9, the motor torque is increased to the maximum regenerative braking torque (paddle regen TQ) indicated by ③-1 of FIG. 9 and, at the same time, the deceleration is increased to the maximum target deceleration.

In addition, in the case of the hold manipulation of the (−) paddle 212 while the motor operates in the first additional regenerative braking amount (Coast-Regen TQ 1) indicated by ②-1 of FIG. 9, the motor torque is likewise controlled to be increased to the maximum regenerative braking torque indicated by ③-1 of FIG. 9 and, at the same time, the deceleration is increased to the maximum target deceleration.

Furthermore, in the case of the hold manipulation of the (−) paddle 212 while the motor operates in the second additional regenerative braking amount (coast-regen TQ 2) indicated by ②-2 of FIG. 9, the motor torque is likewise controlled to be increased to the maximum regenerative braking torque indicated by ③-1 of FIG. 9 and, at the same time, the deceleration is controlled to be increased to the maximum target deceleration.

In addition, in the case of the hold manipulation of the (−) paddle 212 while the motor operates in the third additional regenerative braking amount (coast-regen TQ 3) indicated by ②-3 of FIG. 9, the motor torque is likewise controlled to be increased to the maximum regenerative braking torque indicated by ③-1 of FIG. 9 and, at the same time, the deceleration is controlled to be increased to the maximum target deceleration.

In this case, when the HCU 220 receives a signal of the hold manipulation of the (−) paddle 212 by a driver for the deceleration increase, the HCU 220 variably sets the torque ratio between the front wheel motor and the rear wheel motor including the vehicle deceleration, transmits the command signal for increasing the regenerative braking force of the front wheel motor and the rear wheel motor to the MCU 230, and transmits the command signal for the shift pattern control to the TCU 240.

Accordingly, as described above, deceleration increase control according to the hold manipulation of the (−) paddle and shift control for the deceleration increase by the preset shift pattern as ⑦ of FIG. 9 indicates are performed at the same time, so the vehicle deceleration can be easily increased to the maximum target deceleration.

Deceleration Control when Toggling the (+) Paddle

When toggling the (+) paddle 214, the HCU 220 variably sets the torque ratio between the front wheel motor and the rear wheel motor including the vehicle deceleration, outputs a signal for decreasing the regenerative braking force of the front wheel motor and the rear wheel motor to the MCU 230, and outputs the shift-pattern control signal to the TCU 240, so the deceleration is controlled to be gradually decreased.

For example, as ②-3 of FIG. 9 indicates, deceleration is controlled to be increased to the third additional regenerative braking amount (coast-regen TQ 3) by the toggling manipulation of the (−) paddle 212, and when the toggling manipulation of the (+) paddle 214 is performed twice in succession, the third additional regenerative braking amount (coast-regen TQ 3) indicated by ②-3 of FIG. 9 is adjusted to be decreased in the order of the second additional regenerative braking amount (coast-regen TQ 2) indicated by ②-2 of FIG. 9 and the first additional regenerative braking amount (coast-regen TQ 1) indicated by ②-1 of FIG. 9.

Deceleration Control when Holding the (+) Paddle

In FIG. 9, a reference numeral ⑤ indicates time of performing the hold manipulation of the (+) paddle 214.

Accordingly, when the hold manipulation of the (+) paddle 214 is performed, the HCU 220 variably sets the torque ratio between the front wheel motor and the rear wheel motor including the vehicle deceleration and outputs a signal for the regenerative braking force reduction of the front wheel motor and the rear wheel motor to the MCU 230, and outputs the shift-pattern control signal to the TCU 240. Accordingly, the motor torque is controlled in the basic motor regenerative braking amount, so the deceleration is controlled to be decreased up to a level of the basic motor regenerative braking amount.

That is, in the case of the hold manipulation of the (+) paddle 214, the motor torque is decreased to a predetermined deceleration slope indicated by ⑤-1 of FIG. 9 and is controlled to return to the basic motor regenerative braking amount (coast-regen) indicated by ①-1 of FIG. 9.

For example, in the case of the hold manipulation of the (+) paddle 214 when the motor operates at the maximum regenerative braking torque (paddle regen TQ), the motor torque is controlled to return to the basic motor regenerative braking amount (coast-regen) indicated by ①-1 of FIG. 9.

In addition, in the case of the hold manipulation of the (+) paddle 214 when the motor operates in the third additional regenerative braking amount (coast-regen TQ 3), the motor torque is likewise controlled to return to the basic motor regenerative braking amount (coast-regen) indicated by ①-1 of FIG. 9.

Furthermore, in the case of the hold manipulation of the (+) paddle 214 when the motor operates in the second additional regenerative braking amount (coast-regen TQ 2), the motor torque is likewise controlled to return to the basic motor regenerative braking amount (coast-regen) indicated by ①-1 of FIG. 9.

Additionally, in the case of the hold manipulation of the (+) paddle 214 when the motor operates in the first additional regenerative braking amount (coast-regen TQ 1), the motor torque is likewise controlled to return to the basic motor regenerative braking amount (coast-regen) indicated by ①-1 of FIG. 9.

Vehicle Stopping by the Hold Manipulation of the (−) Paddle

In the case of the hold manipulation of the (−) paddle for a predetermined time or more, the HCU 220 variably sets the torque ratio between the front wheel motor and the rear wheel motor including the vehicle deceleration, sets the torque ratio as a torque ratio of first decreasing the torque of the rear wheel motor and gradually decreasing the torque of the front wheel motor, and outputs a signal for the regenerative braking force reduction of the front wheel motor and the rear wheel motor and vehicle stopping to the MCU 230.

Accordingly, the torque for vehicle stopping in a deceleration slope indicated by ⑥-1 of FIG. 9 is applied to the motor to increase the braking deceleration, and the torque for vehicle stopping is limited to the maximum regenerative braking torque (paddle regen TQ) as indicated by ⑥-2 of FIG. 9.

In this case, when the torque for vehicle stopping reaches the maximum regenerative braking torque (paddle regen TQ) indicated by ⑥-2 of FIG. 9, braking cooperative control by the AHB 250 or an EPB (electric parking brake system) for generating the hydraulic braking force is performed, so the vehicle stops.

Accordingly, the braking by the AHB 250 or EPB which is the braking system is performed after the deceleration increase of the hold manipulation of the (−) paddle proceeds without stepping on the brake pedal. Accordingly, a battery charging effect is maximized and vehicle stopping control can be easily performed due to the motor regenerative braking by the deceleration control.

Changing the Shift Pattern for the Deceleration Control

As described above, the function of performing the toggling manipulation of the paddle 210 and the function of controlling the shift pattern of a transmission for the regenerative braking amount control and the deceleration control of the front wheel can be performed together.

As described above, the deceleration increase control according to the hold manipulation of the (−) paddle and shift control for the deceleration increase according to the shift pattern preset for the front wheel as ⑦ of FIG. 9 indicates are performed at the same time, the vehicle deceleration can be easily increased to the maximum target deceleration.

During Brake Pedal Operation

As described above, if a driver presses the brake pedal when increasing deceleration by the toggling or hold manipulation of the (−) paddle or when decreasing deceleration by the toggling or hold manipulation of the (+) paddle, the braking cooperative control in which the regenerative braking force and the hydraulic braking force are used together is performed.

That is, as described above, if a driver presses the brake pedal when increasing deceleration by the toggling or hold manipulation of the (−) paddle or when decreasing deceleration by the toggling or hold manipulation of the (+) paddle, the basic motor regenerative braking amount (Coast-Regen) indicated by ①-1 of FIG. 9 is the regenerative braking amount and the hydraulic braking force of the AHB 250, which is a braking system, is added thereto, so a vehicle stops.

In a Sport Mode

As described above, when the current driving mode is determined to be the sports mode, the HCU 220 perceives the manipulation function of the paddle 210 not as the function of adjusting the regenerative braking amount but as the function of manually controlling the transmission stage of the transmission.

Accordingly, the lower-stage transmission according to a manual toggling manipulation of the (−) paddle 212 and the upper-stage transmission according to a manual toggling manipulation of the (+) paddle 214 can be performed, and the control of changing the shift pattern of controlling deceleration by manually manipulating the shift pattern of a front wheel transmission can be performed.

At the Time of Conversion to N Stage During Driving in Regenerative Braking Operation As described above, when the current driving mode is determined to be the eco mode in the HCU 220, the function of the pair of paddles 210 including the (−) paddle 212 and the (+) paddle 214 is changed to the function of the regenerative braking amount adjustment, and regenerative braking by the manipulation of the (−) paddle 212 and the (+) paddle 214 is controlled.

When the transmission stage is converted to the N stage during driving in the regenerative braking operation, the HCU 220 transmits a signal of stopping all regenerative braking to the MCU 230 at the same time when the TCU 240 transmits the N stage signal to the HCU 220. Accordingly, the regenerative braking by the motor stops.

In this case, when entering from the N (neutral) stage back to a D (drive) stage, the HCU 220 transmits a command signal of returning to the regenerative braking amount prior to the N stage operation to the MCU 230. Accordingly, the regenerative braking prior to the N stage operation is performed.

For example, when adjusted to the basic motor regenerative braking amount (coast-regen) indicated by ①-1 of FIG. 9, the regenerative braking prior to the N stage operation returns to the same basic motor regenerative braking amount (coast-regen) as the basic motor regenerative braking amount of the time of entering from the N stage back to the D stage.

In addition, when adjusted to the first additional regenerative braking amount (coast-regen TQ 1) indicated by ②-1 of FIG. 9, the regenerative braking prior to the N stage operation returns to the same first additional regenerative braking amount (coast-regen TQ 1) as the first additional regenerative braking amount of the time of entering from the N stage back to the D stage.

In addition, when adjusted to the second additional regenerative braking amount (coast-regen TQ 2) indicated by ②-2 of FIG. 9, the regenerative braking prior to the N stage operation returns to the same second additional regenerative braking amount (coast-regen TQ 2) as the second additional regenerative braking amount of the time of entering from the N stage back to the D stage.

Furthermore, when adjusted to the third additional regenerative braking amount (coast-regen TQ 3) indicated by ②-3 of FIG. 9, the regenerative braking prior to the N stage operation returns to the same third additional regenerative braking amount (coast-regen TQ 3) as the third additional regenerative braking amount (Coast-Regen TQ 3) of the time of entering from the N stage back to the D stage.

Additionally, when adjusted to the maximum regenerative braking torque (paddle regen TQ) indicated by ③-1 of FIG. 9, the regenerative braking prior to the N stage operation returns to the same the maximum regenerative braking torque (paddle regen TQ) as the maximum regenerative braking torque of the time of entering from the N stage back to the D stage.

In the Case of Operation of ABS or TCS During Driving in Regenerative Braking Operation As described above, when the ABS (anti-lock braking system) or a TCS (traction control system), which is a kind of an emergency braking system, operates during driving under regenerative braking control by the manipulation of the (−) paddle 212 and the (+) paddle 214, the HCU 220 transmits the signal of stopping all regenerative braking to the MCU 230 for braking safety. Accordingly, the regenerative braking by the motor stops.

In this case, when the operation of the ABS or TCS stops, the HCU 220 transmits a command signal of returning to the regenerative braking amount prior to the operation of ABS or TCS to the MCU 230, so the regenerative braking prior to the operation of ABS or TCS is performed.

For example, when adjusted to the basic motor regenerative braking amount (coast-regen) indicated by ①-1 of FIG. 9, the regenerative braking prior to operation of the ABS or TCS returns to the same basic motor regenerative braking amount (coast-regen) as the basic motor regenerative braking amount of the time of the operation stop of the ABS or TCS.

In addition, when adjusted to the first additional regenerative braking amount (coast-regen TQ 1) indicated by ②-1 of FIG. 9, the regenerative braking prior to the operation of the ABS or TCS returns to the same first additional regenerative braking amount (coast-regen TQ 1) as the first additional regenerative braking amount of the time of the operation stop of the ABS or TCS.

Furthermore, when adjusted to the second additional regenerative braking amount (coast-regen TQ 2) indicated by ②-2 of FIG. 9, the regenerative braking prior to the operation of the ABS or TCS returns to the same second additional regenerative braking amount (coast-regen TQ 2) as the second additional regenerative braking amount of the time of the operation stop of the ABS or TCS.

Additionally, when adjusted to the third additional regenerative braking amount (coast-regen TQ 3) indicated by ②-3 of FIG. 9, the regenerative braking prior to the operation of the ABS or TCS returns to the same third additional regenerative braking amount (coast-regen TQ 3) as the third additional regenerative braking amount of the time of the operation stop of the ABS or TCS.

In addition, when adjusted to the maximum regenerative braking torque (paddle regen TQ) indicated by ③-1 of FIG. 9, the regenerative braking prior to the operation of the ABS or TCS returns to the same maximum regenerative braking torque (paddle regen TQ) as the maximum regenerative braking torque of the time of the operation stop of the ABS or TCS.

Power Distribution Control of Front and Rear Wheels by the Steering Wheel Operation As described above, when the steering of the steering wheel is determined to operate at a reference angle or more during the regenerative braking control and deceleration control by manipulation of the (−) paddle 212 and the (+) paddle 214, the torque ratio between the front wheel motor and the rear wheel motor can be controlled.

That is, the torque and power ratios between the front wheel motor and the rear wheel motor can be changed depending on the steering angle of the steering wheel in addition to vehicle speed and deceleration.

For example, when a steering angle sensor detects the steering angle of the steering wheel of the reference angle or more, the HCU 220 transmits the command signal of changing the torque ratio and power ratio of the front wheel motor and the rear wheel motor to the MCU. Accordingly, the torque and power ratios between the front wheel motor and the rear wheel motor may be variably controlled according to the steering angle.

As described above, in the AWD hybrid vehicle, front wheel deceleration is controlled by controlling torque and shift pattern of the front wheel motor by paddle manipulation of a driver and, at the same time, rear wheel deceleration is controlled by controlling torque of the rear wheel motor by paddle manipulation of the driver, so optimum regenerative braking energy can be recovered. Accordingly, fuel efficiency can be improved and the regenerative braking can be variously controlled according to vehicle driving conditions during manipulation of the (−) paddle and the (+) paddle, so more intuitive regenerative braking can be performed.

What is claimed is:

1. A regenerative braking control system of an AWD (all-wheel-drive) hybrid vehicle including a front wheel HEV (hybrid electric vehicle) powertrain and a rear wheel EV (electric vehicle) powertrain, the control system comprising:
   a manipulating instrument mounted to a steering wheel for manual shifting and regenerative braking control by a driver's manipulation; and
   a controller configured to adjust a regenerative braking amount and control a shift pattern of a front wheel motor of the front wheel HEV powertrain and to adjust a regenerative braking amount of a rear wheel motor of the rear wheel EV powertrain by receiving a (−) or (+) manipulation signal or a hold manipulation signal of the manipulating instrument.

2. The control system of claim 1, wherein the manipulating instrument comprises a pair of paddles including a (−) paddle and a (+) paddle capable of performing a toggling manipulation or a hold manipulation.

3. A regenerative braking control system of an AWD (all-wheel-drive) hybrid vehicle including a front wheel HEV (hybrid electric vehicle) powertrain and a rear wheel EV (electric vehicle) powertrain, the control system comprising:
  a manipulating instrument mounted to a steering wheel for manual shifting and regenerative braking control by a driver's manipulation; and
  a controller configured to adjust a regenerative braking amount and control a shift pattern of a front wheel motor of the front wheel HEV powertrain and to adjust a regenerative braking amount of a rear wheel motor of the rear wheel EV powertrain by receiving a (−) or (+) manipulation signal or a hold manipulation signal of the manipulating instrument;
  wherein the controller comprises:
    an HCU (hybrid control unit) configured to output a torque command signal and a shift-pattern control signal for adjusting the regenerative braking amount of each of the front wheel motor and the rear wheel motor after variably setting a torque ratio between the front wheel motor of the front wheel HEV powertrain and the rear wheel motor of the rear wheel EV powertrain by receiving the (−) or (+) manipulation signal or the hold manipulation signal of the manipulating instrument;
    an MCU (motor control unit) configured to adjust the regenerative braking amount of each of the front wheel motor and the rear wheel motor on the basis of the torque command signal for the regenerative braking amount adjustment of each of the front wheel motor and the rear wheel motor; and
    a TCU (transmission control unit) configured to perform shift control of an automatic transmission on the basis of the shift-pattern control signal.

4. The control system of claim 3, wherein off detection signals of an APS (accelerator position sensor) and a BPS (brake position sensor) for determining a coasting state of the vehicle are to be transmitted to the HCU during operation of the vehicle.

5. The control system of claim 3, further comprising a driving mode selection switch configured to select a vehicle driving mode as an eco mode or a sports mode, a switching signal of the driving mode selection switch being transmitted to the HCU during operation of the vehicle.

6. The control system of claim 3, wherein when receiving a (−) toggling manipulation signal or the hold manipulation signal of the manipulating instrument while the vehicle is in a coasting state and a driving mode thereof is an eco mode, the HCU is configured to variably set the torque ratio between the front wheel motor and the rear wheel motor and then to output the torque command signal and the shift-pattern control signal for an increase adjustment of the regenerative braking amount of each of the front wheel motor and the rear wheel motor.

7. The control system of claim 3, wherein when receiving a (+) toggling manipulation signal or the hold manipulation signal of the manipulating instrument while the vehicle in a coasting state and a driving mode thereof is an eco mode, the HCU is configured to variably set the torque ratio between the front wheel motor and the rear wheel motor and then to output the torque command signal and the shift-pattern control signal for a decrease adjustment of the regenerative braking amount of each of the front wheel motor and the rear wheel motor.

8. The control system of claim 3, wherein when the vehicle is in a coasting state and a driving mode thereof is a sports mode, the HCU is configured to transmit a lower-stage transmission command signal to a transmission stage lower than a current transmission stage to the TCU when the (−) manipulation signal of the manipulating instrument is received, and the HCU is configured to transmit an upper-stage transmission command signal to a transmission stage higher than the current transmission stage to the TCU when the (+) manipulation signal of the manipulating instrument is received.

9. The control system of claim 3, further comprising:
  an AHB (active hydraulic booster) configured to receive a cooperative control signal for distribution of a total braking force from the HCU and for generating a hydraulic braking pressure of a hydraulic braking system in addition to a regenerative braking force of a motor when the driver presses a brake pedal.

10. A regenerative braking control method of an AWD hybrid vehicle that includes a front wheel HEV powertrain and a rear wheel EV powertrain, the control method comprising:
  determining whether the vehicle is in a coasting state or a current driving mode in a controller;
  changing a function of a driver manipulating instrument to a function of adjusting a regenerative braking amount when the vehicle is determined to be in the coasting state and a driving mode thereof is an eco mode in the controller; and
  adjusting the regenerative braking amount and controlling a shift pattern of a front wheel motor of the front wheel HEV powertrain and to adjust a regenerative braking amount of a rear wheel motor of the rear wheel EV powertrain when the controller receives a (−) or (+) manipulation signal or a hold manipulation signal of the manipulating instrument.

11. The control method of claim 10, wherein adjusting the regenerative braking amount and controlling the shift pattern comprises an HCU of the controller variably setting a torque ratio between the front wheel motor of the front wheel HEV powertrain and the rear wheel motor of the rear wheel EV powertrain and then outputting a torque command signal for the regenerative braking amount adjustment of the front wheel motor and the rear wheel motor and a shift-pattern control signal.

12. The control method of claim 10, wherein when vehicle speed is higher than 0 KPH, an APS is off, and a BPS is off while an HCU of the controller receives a signal of a vehicle speed sensor, a signal of an APS (accelerator position sensor), and a signal of a BPS (brake position sensor), the vehicle is determined to be in the coasting state.

13. The control method of claim 10, further comprising:
  determining whether a first manipulation signal for performing a (−) manipulation of the manipulating instrument is an initial one-time toggling input signal or a one-time hold input signal; and
  after determining the first manipulation signal is the initial one-time toggling input signal, setting target deceleration by vehicle speed and setting a variable torque ratio between the front wheel motor and the rear wheel motor as a target torque ratio for meeting the target deceleration by an HCU of the controller.

14. The control method of claim 13, further comprising:
receiving, by the HCU, an additional one-time toggling input signal for continuously performing the (−) manipulation of the manipulating instrument within a predetermined time after receiving the initial one-time toggling input signal;
performing control of an increase of regenerative braking torque of the front wheel motor and the rear wheel motor to a predetermined level whenever the additional one-time toggling input signal is received; and
performing shift control on the basis of the shift pattern that is preset for the front wheel for increasing deceleration.

15. The control method of claim 10, further comprising:
determining whether a first manipulation signal for a (−) manipulation of the manipulating instrument is an initial one-time toggling input signal or a one-time hold input signal; and
after determining the first manipulation signal is the one-time hold input signal, setting target deceleration by vehicle speed and setting a variable torque ratio between the front wheel motor and the rear wheel motor as a target torque ratio for meeting the target deceleration by an HCU of the controller.

16. The control method of claim 15, further comprising:
after receiving the one-time hold input signal as the first manipulation signal for performing the (−) manipulation of the manipulating instrument in the HCU of the controller, performing a control of increasing a regenerative braking torque of the front wheel motor up to maximum regenerative braking torque, a control of increasing a regenerative braking torque of the rear wheel motor up to a predetermined level, and shift control on the basis of the shift pattern that is preset for the front wheel for increasing deceleration.

17. The control method of claim 10, further comprising:
determining whether a second manipulation signal for performing a (+) manipulation of the manipulating instrument is an initial one-time toggling input signal or a one-time hold input signal; and
after determining the second manipulation signal is the initial one-time toggling input signal, setting release of target deceleration by vehicle speed and setting a torque ratio between the front wheel motor and the rear wheel motor as a torque ratio for the target deceleration release by an HCU of the controller.

18. The control method of claim 17, further comprising:
receiving an additional one-time toggling input signal for continuously performing the (+) manipulation of the manipulating instrument within a predetermined time after receiving the initial one-time toggling input signal;
performing a control of decreasing a regenerative braking torque of the front wheel motor to a predetermined level whenever the additional one-time toggling input signal is received; and
performing shift control on the basis of the shift pattern that is preset for the front wheel for decreasing deceleration.

19. The control method of claim 10, further comprising:
determining a second manipulation signal for performing a (+) manipulation of the manipulating instrument is a one-time hold input signal; and
setting release of target deceleration by vehicle speed and setting a torque ratio between the front wheel motor and the rear wheel motor as a torque ratio for the target deceleration release by an HCU of the controller.

20. The control method of claim 19, further comprising:
receiving the one-time hold input signal as the second manipulation signal for the (+) manipulation of the manipulating instrument in the HCU of the controller;
performing a control of decreasing a regenerative braking torque of the front wheel motor to a reference regenerative braking torque; and
performing shift control on the basis of the shift pattern that is preset for the front wheel for decreasing deceleration.

21. The control method of claim 10, further comprising:
determining the current driving mode is a sports mode; and
changing a function of the manipulating instrument to a transmission stage adjustment function of a transmission by an HCU of the controller, so that when a first manipulation signal for the (−) toggling manipulation is received, a control for a transmission stage decrease is executed, and when a second manipulation signal for a (+) toggling manipulation is received, a control for a transmission stage increase is executed.

22. The control method of claim 10, further comprising:
holding a (−) manipulation of the manipulating instrument for a predetermined time or more;
limiting motor torque to maximum regenerative braking torque; and
performing braking cooperative control by an AHB (active hydraulic booster) or an EPB (electric parking brake system) for generating the hydraulic braking force.

23. The control method of claim 10, wherein at a time of conversion to N (neutral) stage during driving in the regenerative braking operation and when ABS (anti-lock braking system) or TCS (traction control system) operates during the driving in the regenerative braking operation, regenerative braking of the front wheel motor and the rear wheel motor stops, and when entering from the N stage back to a D (drive) stage and when the operation of the ABS or TCS is released, regenerative braking of the front wheel motor and the rear wheel motor is performed in the previous regenerative braking amount.

* * * * *

UNITED STATES PATENT AND TRADEMARK OFFICE
CERTIFICATE OF CORRECTION

| | |
|---|---|
| PATENT NO. | : 11,554,780 B2 |
| APPLICATION NO. | : 16/898991 |
| DATED | : January 17, 2023 |
| INVENTOR(S) | : Yong Kak Choi et al. |

It is certified that error appears in the above-identified patent and that said Letters Patent is hereby corrected as shown below:

In the Claims

Claim 12, Column 20, Line 54; delete "o KPH" and insert --0 KPH--.

Signed and Sealed this
Fourteenth Day of February, 2023

Katherine Kelly Vidal
*Director of the United States Patent and Trademark Office*